No. 682,763. Patented Sept. 17, 1901.
I. H. SPENCER.
VARIABLE SPEED DEVICE.
(Application filed Dec. 13, 1900.)
(No Model.) 3 Sheets—Sheet I.

Witnesses
Wm P. Laraway
L. C. Wood

Inventor
Ira H. Spencer
by E. E. Whitney
Attorney

No. 682,763. Patented Sept. 17, 1901.
I. H. SPENCER.
VARIABLE SPEED DEVICE.
(Application filed Dec. 13, 1900.)
(No Model.) 3 Sheets—Sheet 2.

Witnesses
Wm. P. Laraway
L. C. Wood

Inventor
Ira H. Spencer
by E. C. Whitney, Attorney

No. 682,763. Patented Sept. 17, 1901.
I. H. SPENCER.
VARIABLE SPEED DEVICE.
(Application filed Dec. 13, 1900.)
(No Model.) 3 Sheets—Sheet 3.

Witnesses:

Inventor:
Ira H. Spencer,

UNITED STATES PATENT OFFICE.

IRA H. SPENCER, OF HARTFORD, CONNECTICUT.

VARIABLE-SPEED DEVICE.

SPECIFICATION forming part of Letters Patent No. 682,763, dated September 17, 1901.

Application filed December 13, 1900. Serial No. 39,729. (No model.)

*To all whom it may concern:*

Be it known that I, IRA H. SPENCER, a citizen of the United States of America, and a resident of the city and county of Hartford and State of Connecticut, have invented certain new and useful Improvements in Variable-Speed Devices, of which the following is a specification.

This invention relates to variable-speed devices of that class in which the driving and driven members are disposed in concentric relation and in which a rotating friction wheel or disk constitutes the actuating-connector between said members, and the angular adjustment of said disk in the plane of the axis of said members governs the velocity of one member with respect to the other.

An object of the present invention is to produce a compact, simplified, durable, and efficient variable-speed device in which the driving and driven members, the friction-disks between said members, and their supporting means will be wholly incased, whereby to prevent the admission of dust or dirt and obviate the injurious effects incidental thereto and commonly experienced with friction variable-speed devices of known construction.

A further object of the invention is to provide, in connection with the friction members of a variable-speed device, means for automatically varying the frictional stress between said members in accordance with the variations in resistance of the work performed.

With these and further objects hereinafter disclosed in view the invention consists in certain details of construction and in the combination and organization of the several parts of the variable-speed device, substantially as hereinafter described, and more particularly pointed out in the claims.

Figure 1:
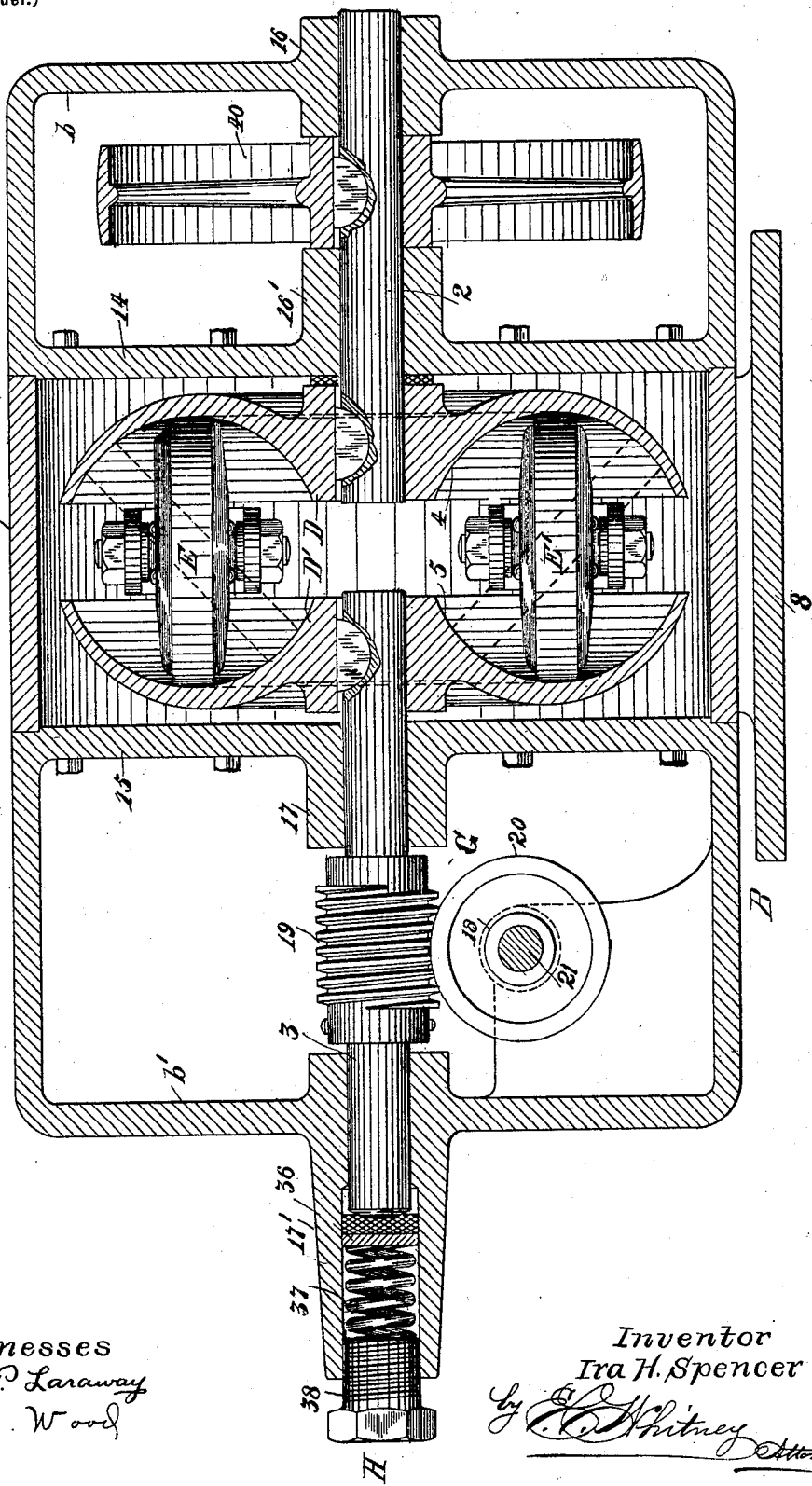
Figure 2:
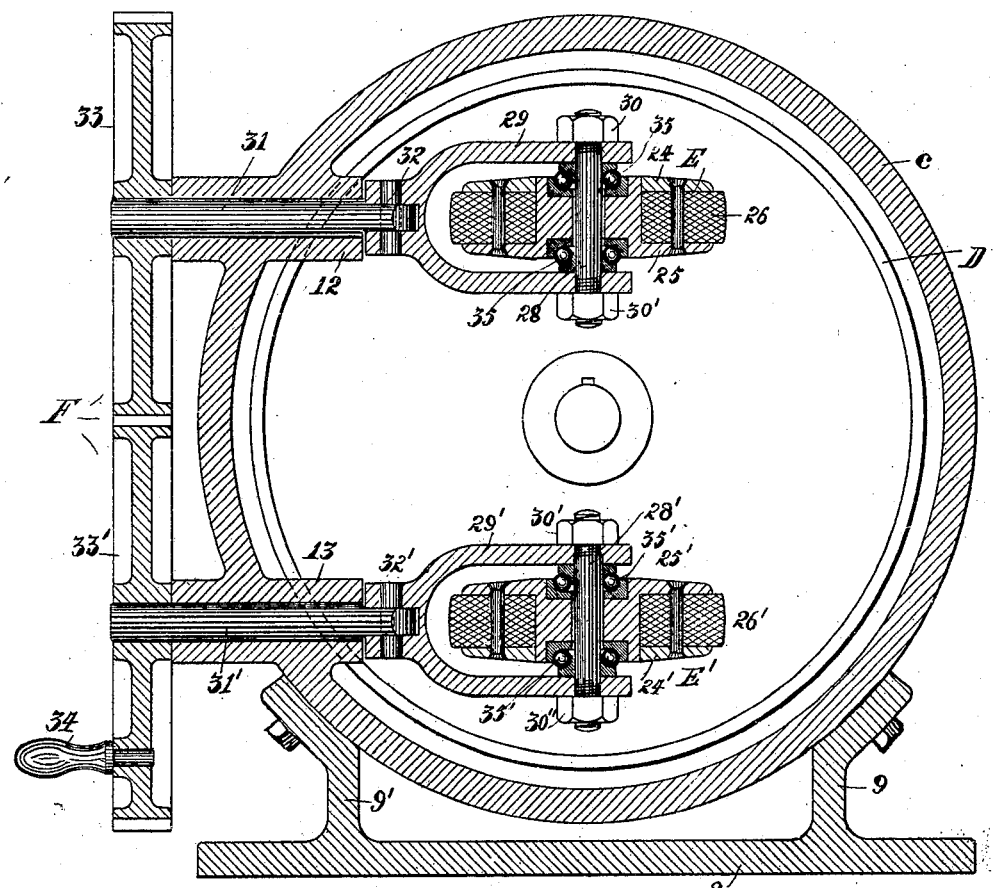
Figure 3:
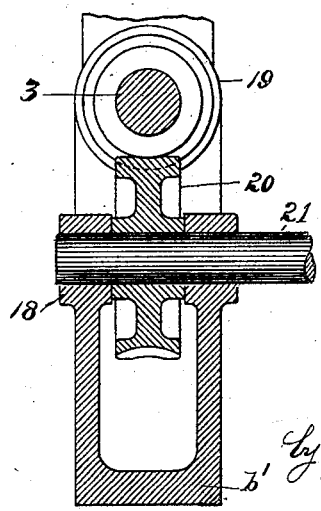
Figure 4:
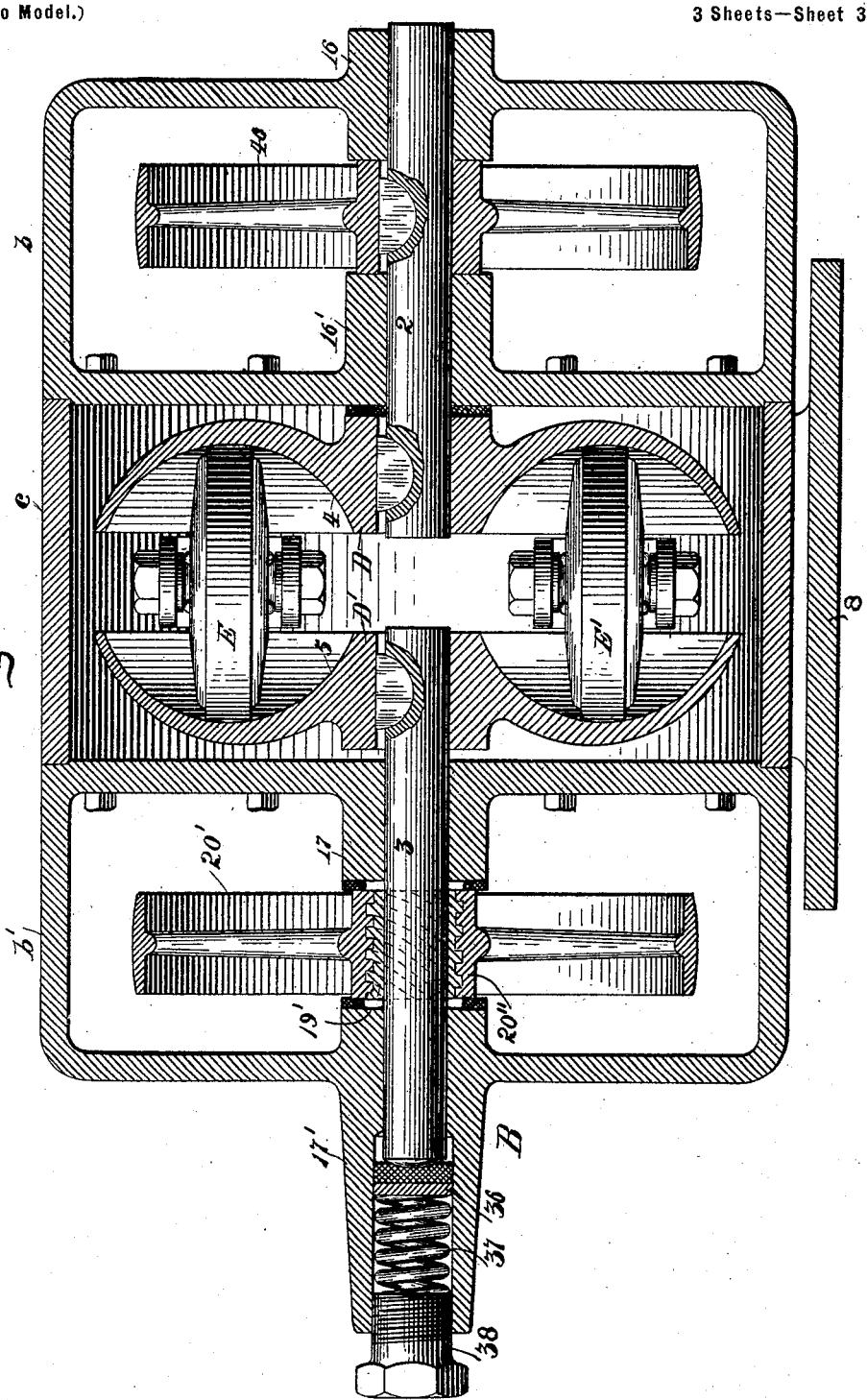

In the drawings accompanying and forming part of this specification, Figure 1 is a side elevation, partly in central vertical section, of a variable-speed device embodying this invention in one construction and organization thereof. Fig. 2 is a transverse vertical section of the same, taken through the center of the cylindrical casing. Fig. 3 is an end view of the worm and worm-wheel which constitutes the automatically-effective friction-controlling means; and Fig. 4 is a view similar to Fig. 1 of the variable-speed device, showing a slightly-modified form of automatically-effective friction-controlling means.

Similar characters represent like parts in all the figures of the drawings.

In the preferred construction and organization thereof illustrated in the accompanying drawings the variable-speed device comprises a suitable framework (designated in a general way by B) and including a cylindrical casing $c$ and two skeleton frames $b$ and $b'$, respectively; two axially-alined shafts 2 and 3, journaled in suitable bearings on the framework; two concentrically-disposed driving and driven members D and D', disposed within the cylindrical casing and fixed to the inner ends of the shafts 2 and 3, respectively, and having oppositely-disposed concentric concaved annular adjacent faces 4 and 5, respectively; two friction wheels or disks E and E', pivotally supported between and engaging the concaved adjacent faces of the two members D and D', preferably at opposite sides of the axis of said members; supporting and adjusting means (designated by F) for said friction-wheels; automatically-effective member-positioning and stress-regulating means (designated by G) for varying the frictional stress between the friction-disks and driving and driven members according to the variations in resistance met with by the driven shaft, and an independent reactionary thrust device (designated by H) in connection with one shaft and effective for regulating the normal frictional stress between the driving and driven members and disks, substantially as hereinafter more fully described.

The framework in the preferred construction and organization thereof shown in the accompanying drawings comprises a suitable base 8, shown having upright curve-faced flanges 9 and 9'; a cylindrical casing $c$, supported upon and secured to said base and having two elongated parallel bearings 12 and 13, disposed with their axes in a common plane intersecting the axis of said casing; two open-end frames, (designated by $b$ and $b'$, respectively,) including two disk-like heads 14 and 15, secured to and closing the ends of the cylinder or cylindrical casing $c$ and each having two independent axially-alined horizontal bearings which are coincident with the center of the cylinder or casing c, the bearings on the frame b being indicated by 16 and 16' and those on the frame b' being indicated by 17 and 17'. The frame b in the form shown in Figs. 1 and 3 also includes a transverse horizontal bearing 18, shown disposed below the common axis of the bearings 16 and 16' and located substantially midway between adjacent ends of said bearings. The cylindrical casing c will preferably be secured to the flanges 9 and 9' of the base 8 by means of screw-bolts, as shown in Fig. 2, and the frames b and b' will be secured to opposite ends of the cylinder by means of screw-bolts, as indicated in Fig. 1, and those portions of the end frame b or b' extending outward from the heads 14 and 15 will preferably be of skeleton construction to give access to the parts supported between the heads and the end bars of said frame.

By the construction of framework herein described access may be had to the interior of the cylinder or cylindrical casing c by simply removing one or the other end frames b and b'. Mounted for rotation in the bearings 16 and 16' and terminating in the cylinder c is the driving-shaft or rotative member 2, which is held as against longitudinal movement, and mounted in the bearing 17 and 17' and terminating in said cylinder in axial alinement with the driving-shaft 2 is the driven shaft or rotative member 3, which shaft is supported for a limited amount of longitudinal movement and has in the form shown in Figs. 1 and 3 secured thereto intermediate said bearings a worm 19, which meshes with a rotative member or power-transmitter, shown in said figures as a worm-wheel 20, fixed to a power-transmitting shaft 21, journaled in the transverse bearing 18. This worm and worm-wheel constitute, primarily, an automatically-effective device for increasing and decreasing the frictional stress between the friction-wheels and driving and driven members, according as the resistance to which the power-transmitter is subjected increases or decreases or proportionate to the resistance due to the work being done, said shaft 21 in the organization shown in said figures being in practice connected to or constituting the power-shaft of the mechanism or machine (not shown) to be driven by the variable-speed device.

Fixed to the inner ends of the driving and driven shafts 2 and 3, respectively, are the driving and driven members D and D', herein shown somewhat in the nature of disks having concaved annular working faces 4 and 5, respectively, which concaved faces are preferably disposed in concentric arcs. One of these members, as D, and its shaft 2 are fixed as against movement longitudinally of the axis of said shaft, whereas the member D' and its shaft are capable of movement toward and away from the member D for the purpose of taking up wear and also for the purpose of increasing and decreasing frictional stress between the members D and D' and the friction-wheels E and E', according to the amount of driving force to be exerted by the power-transmitting shaft 21, which is driven through the medium of the worm-gearing in connection with the driven shaft 3.

The friction-wheels, which are designated in a general way by E and E', are shown supported for rotation and for angular adjustment transversely of their planes of rotation and in the plane of the arc described by the two faces 4 and 5 of the two members D and D' at diametrically opposite sides of the common axis of the two members D and D' with diametrically opposite peripheral portions of each friction-wheel in contact with the opposing faces 4 and 5 of the two members D and D'. These friction-wheels, which may be of any suitable general construction and which will usually be duplicates of one another, are each shown consisting of two side plates 24 and 25, one of which has an axially-recessed hub extending through the other, a fiber annulus 26, surrounding the hub of the plate 24 and extending beyond the peripheries of the two plates 24 and 25, and means shown as rivets extending through the plates and annulus and securing the parts together. The supporting and adjusting means for the two friction-wheels E and E' are shown of duplicate construction, and for convenience one only will be described. The supporting and adjusting means for one friction-wheel, as E, is shown consisting of a short shaft 28, extending through the friction-wheel, a bifurcated hanger or fork 29 straddling the friction-wheel and supporting opposite ends of the short shaft 28, which short shaft is preferably screw-threaded at its end and furnished with nuts 30 and 30' for holding the same in place, an adjusting-shaft 31, journaled in a bearing on the casing and having a hinged connection 32 at its inner end with the bifurcated hanger, and a gear-wheel 33, secured to the outer end of said shaft.

It will be understood that the description of the parts of the supporting and adjusting means for the friction-wheel E applies to duplicate parts of the supporting and adjusting means for the friction-wheel E', which are indicated by the same characters with affixed prime-marks.

The two adjusting-shafts 31 and 31' of the supporting and adjusting means are shown supported in the parallel horizontally-disposed bearings 12 and 13, respectively, constituting part of the casing or cylinder c, and the two gear-wheels 33 and 33', fixed to the outer ends of said shafts, are shown in intermeshing relation, one of said wheels being shown provided with means—a handle 34—whereby the same may be rotated to effect a concurrent rotation of the two shafts 31 and 31' in opposing directions to secure proper angular adjustment of the two friction-wheels E and E'.

The friction-wheels E and E' are shown supported by ball-bearings, (designated in a general way by 35 and 35',) which may be of any suitable construction and organization. As a simple and convenient means for maintaining a predetermined normal frictional stress between the friction-wheels and the driving and driven members and for arbitrarily varying the normal stress and normal working position of the driven member D' I have provided, in connection with the driven shaft, a reactionary thrust device H, which in one form thereof shown in the accompanying drawings comprises a thrust member 36, supported for reciprocatory movements in an enlarged recess in the bearing 17' and having a fiber washer in bearing engagement with the outer end of the driven shaft 3, a spiral spring 37, disposed in said enlarged recess and bearing at one end against the thrust member 36, and an adjusting-screw 38, fitting the outer end of the enlarged recess in the bearing 17' and having its inner end in engagement with the other end of the spring. The thrust device H normally retains the driven member D' in working position with relation to the peripheries of the two friction-wheels E and E' and maintains a normal pressure, which may be regulated as desired.

The driving-shaft 2 is shown provided intermediate the bearing 16 and 16' with a band-wheel 40, which may be rotated from any suitable source of power, (not shown,) the opposite ends of the hub of said band-wheel abutting against adjacent ends of the bearings 16 and 16' and constituting a means for holding said shaft against longitudinal movement.

By providing a hinge connection between the hangers of the friction-wheels E and E' and the adjusting-shafts 31 and 31', as shown, for instance, in Fig. 2, each wheel may be moved bodily in the plane of rotation of said wheel to compensate for differences in position of the driven member D' with respect to the driving member D.

In Fig. 4 of the drawings the means for automatically controlling the frictional stress between the friction-wheel and the driving and driven members is shown as a screw or worm 19', fixed to the driven shaft, and a wheel 20', having a spirally-threaded hub 20", meshing with said screw or worm. In other words, it comprises two axially-coincident rotative members 19' and 20', respectively, in spiral connection, and one of which members is adapted for movement in the plane of the axis thereof and independently of the other and the other of which members is held as against movement in the plane of its axis, this constituting a simple and efficient means where it is desired to drive direct from the driven shaft 3.

By providing a spiral connection between the driven shaft 3 and the power-transmitter (which power-transmitter may be the worm-wheel 20 illustrated in Fig. 1 or may be the band-wheel 20' illustrated in Fig. 4) it will be seen that the resistance exerted by the power-transmitter against the worm 19 (or 19', as the case may be) will be more or less according to the work being done and that the first result of this resistance will be to screw the shaft 3 and the driven member D' inward toward the driving member D until it has reached the limit of its reciprocatory movement. Consequently the greater the resistance exerted by the power-transmitter the greater will be the frictional stress exerted between the driven member D upon the friction-wheels, this stress being reduced proportionately as the resistance is reduced, thus automatically effecting the requisite regulation of frictional stress proportionate to the resistance met with by the power-transmitter, which is a great desideratum in frictional driving devices of this character. It is desired to state in this connection and it will be obvious that the relations of the driving and driven shafts may be reversed—that is, the shaft 3 may constitute the driving-shaft and the shaft 2 may constitute the driven shaft, in which case the power-transmitter would constitute the main driver and the band-wheel 40 would then constitute the power-transmitter. Therefore it will be understood that the terms "driving" and "driven" as herein employed may relate to the shafts 2 and 3 without choice.

By reference to the drawings it will be seen that all the friction elements are wholly incased by the cylinder c, which is another matter of considerable importance, as it keeps these parts free from dust, which otherwise might interfere with the proper working thereof.

When the friction-wheels are in the full-line parallel position shown in Fig. 1, the driving and driven shafts will have corresponding velocities or one to one movements; but when in the dotted-line position in said Fig. 1 the velocity of the driven shaft will be greatly in excess of the velocity of the driving-shaft, as will be readily understood.

I claim—

1. In a variable-speed device, a frame including a base; a cylinder secured to said base; and two skeleton end frames having two disk-like heads secured to and closing the ends of said cylinder and said end frames also having axially-alined bearings for supporting the driving and driven shafts, and the cylinder having a bearing the axis of which is disposed in transverse relation to the axes of the end frame-bearings and which is adapted for supporting the friction-disk-guiding shaft.

2. In a variable-speed device, a frame having a plurality of axially-alined bearings one of which has an enlarged recess for receiving a thrust device; a driving and a driven shaft supported in said bearings one in advance of the other and the latter of which is longitudinally movable; a driving and a driven member secured to said shafts respectively and having concaved annular adjacent faces; friction-wheels adjustably and rotatably supported between and engaging the concaved faces of the two members; and a reactionary adjustable thrust device disposed in the enlarged recess and bearing against the extreme outer end of the driven shaft, whereby to retain the driven member in working engagement with the friction-wheels under predetermined normal stress.

3. In a variable-speed device, a frame including a cylindrical casing; a driving and a driven shaft journaled in said frame and terminating remote from each other in said casing; a driving and a driven member fixed to the ends of said shafts respectively within said casing; a friction-wheel supported for rotation with opposite faces in engagement with the adjacent faces of the driving and driven member; an adjusting-shaft disposed in intersecting relation with the axis of the friction-wheel and journaled in a bearing on the cylindrical casing and having a hinge connection with the friction-wheel; and gearing for rotating said shaft to adjust the friction-wheel in the plane of the axis of the driving and driven members.

4. In a variable-speed device, a framework including a cylinder and two end frames having disk-like heads removably secured to the ends of said cylinder; a driving-shaft wholly supported in bearings on one end frame and terminating in the cylinder; a driven shaft wholly supported in bearings on the other end frame and terminating in the cylinder; a driving and a driven member secured to the driving and driven shafts, respectively within said cylinder; friction-wheels supported independent of the end frames in said cylinder and engaging the adjacent faces of the driving and driven members; means independent of the end frames for effecting angular adjustment of the friction-wheels to change the relative velocities of the driving and driven members; means for retaining the driving and driven members in frictional engagement with the friction-wheels; and means for rotating the driving-shaft, the construction and organization of the parts being such that one shaft and one member secured thereto will be withdrawn with the end frame supporting the same on the removal of said end frame from said cylinder.

Signed by me at Hartford, Connecticut, this 3d day of December, A. D. 1900.

IRA H. SPENCER.

Witnesses:
E. C. WHITNEY,
L. C. WOOD.